United States Patent [19]

Scheifers et al.

[11] Patent Number: 5,723,229
[45] Date of Patent: Mar. 3, 1998

[54] PORTABLE FUEL CELL DEVICE INCLUDING A WATER TRAP

[75] Inventors: Steven Michael Scheifers, Hoffman Estates, Ill.; Donald H. Klosterman, Gilbert, Ariz.; Marc Kenneth Chason, Schaumburg; Karl W. Wyatt, Cary, both of Ill.

[73] Assignee: Motorola, Inc., Schaumburg, Ill.

[21] Appl. No.: 676,790

[22] Filed: Jul. 8, 1996

[51] Int. Cl.$^6$ ................................ H01M 8/06
[52] U.S. Cl. ....................... 429/19; 429/34; 429/39
[58] Field of Search ............................ 429/17, 19, 34, 429/38, 39

[56] References Cited

U.S. PATENT DOCUMENTS

| | | |
|---|---|---|
| 4,863,813 | 9/1989 | Dyer. |
| 4,894,301 | 1/1990 | Dyer. |
| 4,988,582 | 1/1991 | Dyer. |
| 5,094,928 | 3/1992 | Dyer. |
| 5,102,750 | 4/1992 | Taylor. |

*Primary Examiner*—M. Nuzzolillo
*Attorney, Agent, or Firm*—Douglas D. Fekete; John B. MacIntyre

[57] ABSTRACT

A portable fuel cell device (10) includes a fuel reservoir (26) and an oxidant chamber (34). Gaseous fuel from the fuel reservoir (26) is mixed with an oxidant from the oxidant chamber (34) by an aspirator (42) to form a fuel-oxidant mixture. The fuel-oxidant mixture is passed through a fuel-oxidant line (44) into a fuel cell (13). The fuel cell (13) contains a reaction chamber (20) that generates electricity by reacting the fuel-oxidant mixture. Waste gaseous products, such as water and carbon dioxide, are sent through an exhaust line (24) to a water trap (46). The water trap (46) contains a water absorbing medium (52) for absorbing the water vapor from the exhaust gas, thereby forming a dry exhaust gas. The dry exhaust gas is released through the exhaust vent (48) into the ambient atmosphere.

11 Claims, 4 Drawing Sheets

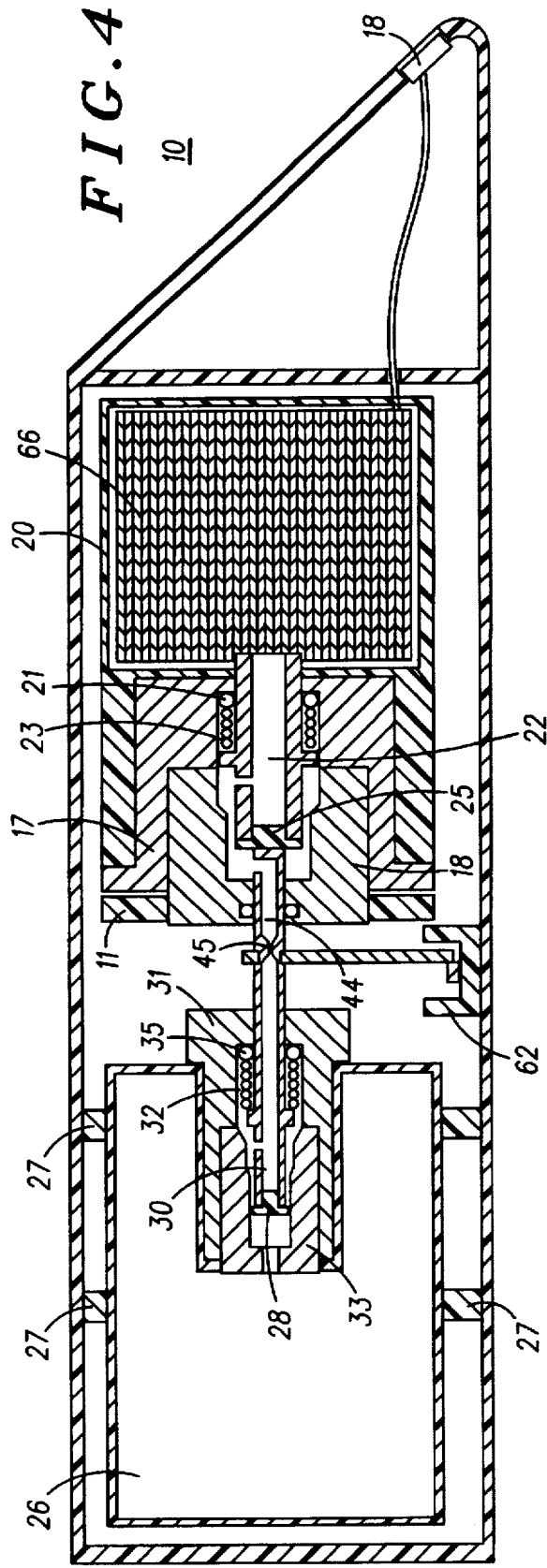
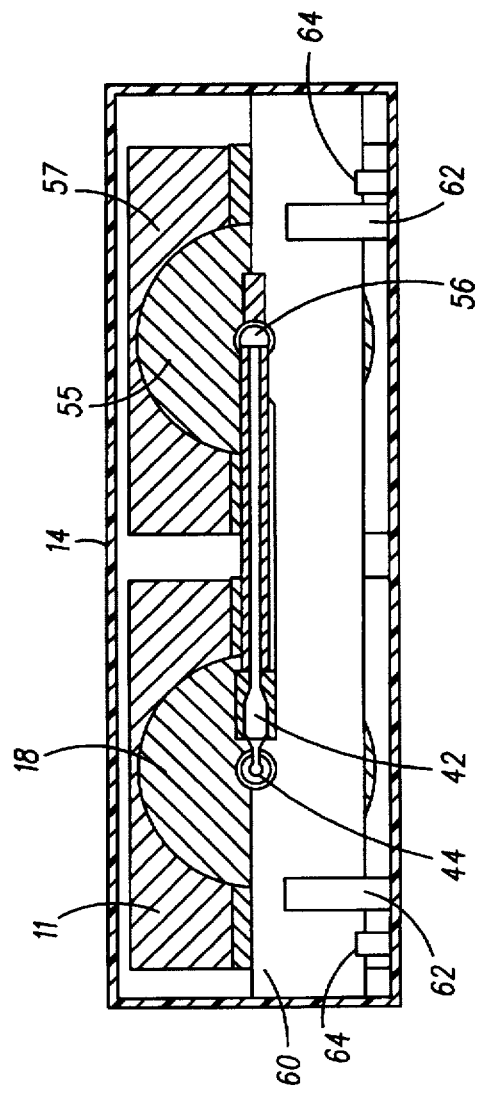

5,723,229

PORTABLE FUEL CELL DEVICE INCLUDING A WATER TRAP

FIELD OF THE INVENTION

This invention relates generally to a portable fuel cell device, and in particular to a portable fuel cell device that includes a water trap for processing exhaust gases produced during the generation of electricity.

BACKGROUND OF THE INVENTION

Devices which incorporate electrolytes to produce or store electrical energy are known in the art. Such devices, commonly referred to as fuel cells, produce electrical energy by reacting fuels with oxidizers. Exhaust gases, such as water and carbon dioxide, are produced by this reaction.

A limitation on prior art fuel cells is the processing of the exhaust gases. The water and carbon dioxide produced are generally vented to the ambient atmosphere or released into the housing. This is acceptable in certain large-scale applications, but when the fuel cell is being used to power a portable electronic product, the release of water onto the user of the device powered by the fuel cell is unacceptable.

Consequently, a need exists for a portable fuel cell device to power portable products which effectively processes exhaust gases.

BRIEF DESCRIPTION OF THE DRAWINGS

FIG. 4 is a cross-sectional view of the portable fuel cell device in FIG. 1 taken along line 4—4; and FIG. 5 is a cross-sectional view of the portable fuel cell device in FIG. 1 taken along line 5—5.

DETAILED DESCRIPTION OF A PREFERRED EMBODIMENT

Figure 1:
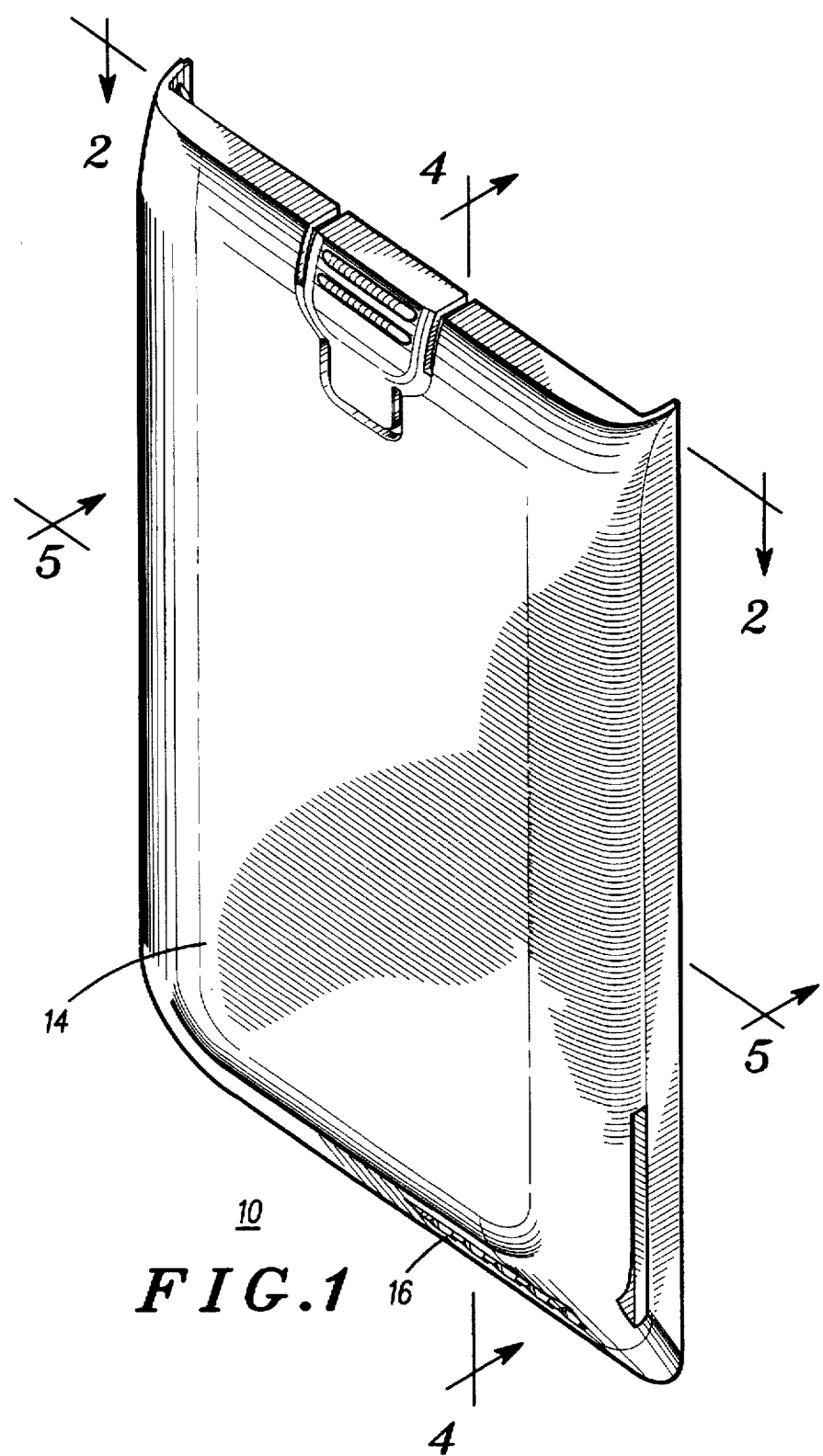
FIG. 1 is a perspective view of a portable fuel cell device in accordance with a preferred embodiment of the present invention.

The present invention provides a portable fuel cell device for reacting a gaseous fuel and a gaseous oxidant to produce electricity. The reaction results in the formation of gaseous products, including water vapor and carbon dioxide. The fuel cell contains a reaction chamber which generates electricity by reacting a mixture comprising the gaseous fuel and the gaseous oxidant. The portable fuel cell device includes a fuel reservoir that connects to a fuel line and supplies gaseous fuel to a reaction chamber within the fuel cell. An oxidant chamber connects to the fuel line and supplies a gaseous oxidant to the reaction chamber. An aspirator mixes the gaseous oxidant with the gaseous fuel to form the mixture. The fuel line connects with the reaction chamber and introduces the mixture into the fuel cell. The exhaust line connected to the reaction chamber expels exhaust gas, containing gaseous products, from the reaction chamber. The water trap connects to the exhaust line and contains a water absorbing medium for absorbing water vapor from the exhaust gas, thereby forming a dry exhaust gas. The exhaust vent releases the dry exhaust gas from the water trap into the ambient atmosphere.

A preferred embodiment of the present invention can be better understood with reference to FIGS. 1–5. A portable fuel cell device 10 is comprised of a base 12 and a cover 14. In a preferred embodiment, base 12 is slid into cover 14. Base 12 can also be snapped onto cover 14. Base 12 has contacts 16 fixably attached thereto which provide transference of the electricity to an electronic product. A longitudinal axis 19 is defined through the center of base 12.

A fuel cell 13 is affixed to base 12 and supported by fuel cell supports 11. Fuel cell 13 comprises a reaction chamber 20 and is operably coupled to contacts 16 to transfer electricity to a coupled portable electronic device. Reaction chamber 20 is defined within plastic integrally-molded body 68 and comprises a series of plates 66 for generating electricity by reacting a mixture comprising a gaseous fuel and a gaseous oxidant. Fuel line 22 connects axially to reaction chamber 20. Fuel line 22 is defined within first female valve body 17 and second female valve body 18. Spring 23 moves axially and expands in the closed position depicted in FIG. 2 and compresses in the open position depicted in FIG. 3. O-ring 21 is a seal which keeps reaction chamber 20 isolated from fuel mixture inlet 22. Stop 25 is disposed at the end of fuel line 22 and is composed of a pliable material such as rubber. Exhaust line 24 connects with reaction chamber 20 and runs perpendicular to longitudinal axis 19. O-ring 15 is a seal which prevents fuel or oxygen from escaping from the gas or oxygen cartridges into the housing or the ambient environment.

Aspirator 42 connects fuel line 30 with oxidant line 38. Aspirator 42 mixes fuel from fuel line 30 with oxidant from oxidant line 38. The resultant mixture moves axially through fuel-oxidant line 44. Ball 43 is seated in aspirator 42 to prevent gas flow when in the closed position. Venturi 45 admits the oxidant, such as ambient air or oxygen, into fuel-oxidant line 44.

A fuel reservoir 26 is fixably attached to base 12 and supported by fuel chamber supports 27 and fuel and oxidant chamber supports 29. A fuel line 30 is defined within fuel chamber valve 31 and fuel chamber valve body 33 and connects axially to fuel reservoir 26. In the closed position represented in FIG. 2, a stop 28, made from a pliable material such as rubber, restricts fuel flow from fuel reservoir 26 into fuel line 30. Spring 32 moves axially and expands in the closed position depicted in FIG. 2 and compresses in the open position depicted in FIG. 3. O-ring 35 is a seal which keeps fuel reservoir 26 isolated from fuel line 30.

In a preferred embodiment, an oxidant chamber 34 is fixably attached to base 12 and supported by fuel and oxidant chamber supports 29 and oxidant chamber supports 37. An oxidant line 38 is defined within first oxidant chamber valve body 39 and second oxidant chamber valve body 47 and connects axially to oxidant chamber 34. Spring 40 moves axially and expands in the closed position depicted in FIG. 2 and compresses in the open position depicted in FIG. 3. O-ring 41 is a seal which keeps oxidant chamber 34 isolated from oxidant line 38. In the closed position represented in FIG. 2, a stop 36, made from a pliable material such as rubber, restricts oxidant flow from oxidant chamber 34 into oxidant line 38.

A water trap 46 is fixably attached to base 12 and is supported by exhaust chamber supports 57. Exhaust line 24 connects with water trap 46 and preferably runs perpendicular to longitudinal axis 19. By-products exhaust line 48 is defined within first female valve body 53 and second female valve body 55 and connects axially with water trap 46. O-ring 49 is a seal which keeps water trap 46 isolated from by-products exhaust line 48. In the closed position represented in FIG. 2, a stop 54, made from a pliable material such as rubber, restricts exhaust flow from water trap 46 into exhaust vent 56. O-ring 51 is a seal which prevents fuel or oxygen from escaping from the gas or oxygen cartridges into the housing or into the ambient environment.

Water trap 46 contains a water absorbing medium 52. In a preferred embodiment, water absorbing medium 52 is comprised of a copolymer of sodium polyacrylate and polyacrylamide. The copolymer of sodium polyacrylate and polyacrylamide absorbs a significant amount of water. In an alternate embodiment, water absorbing medium 52 is comprised of ascarite. In a preferred embodiment, water absorbing medium 52 is replaceable and contained within a replaceable cartridge. In an alternate embodiment, water absorbing medium 52 is allowed to evaporate the absorbed water into the ambient atmosphere.

Figure 2:
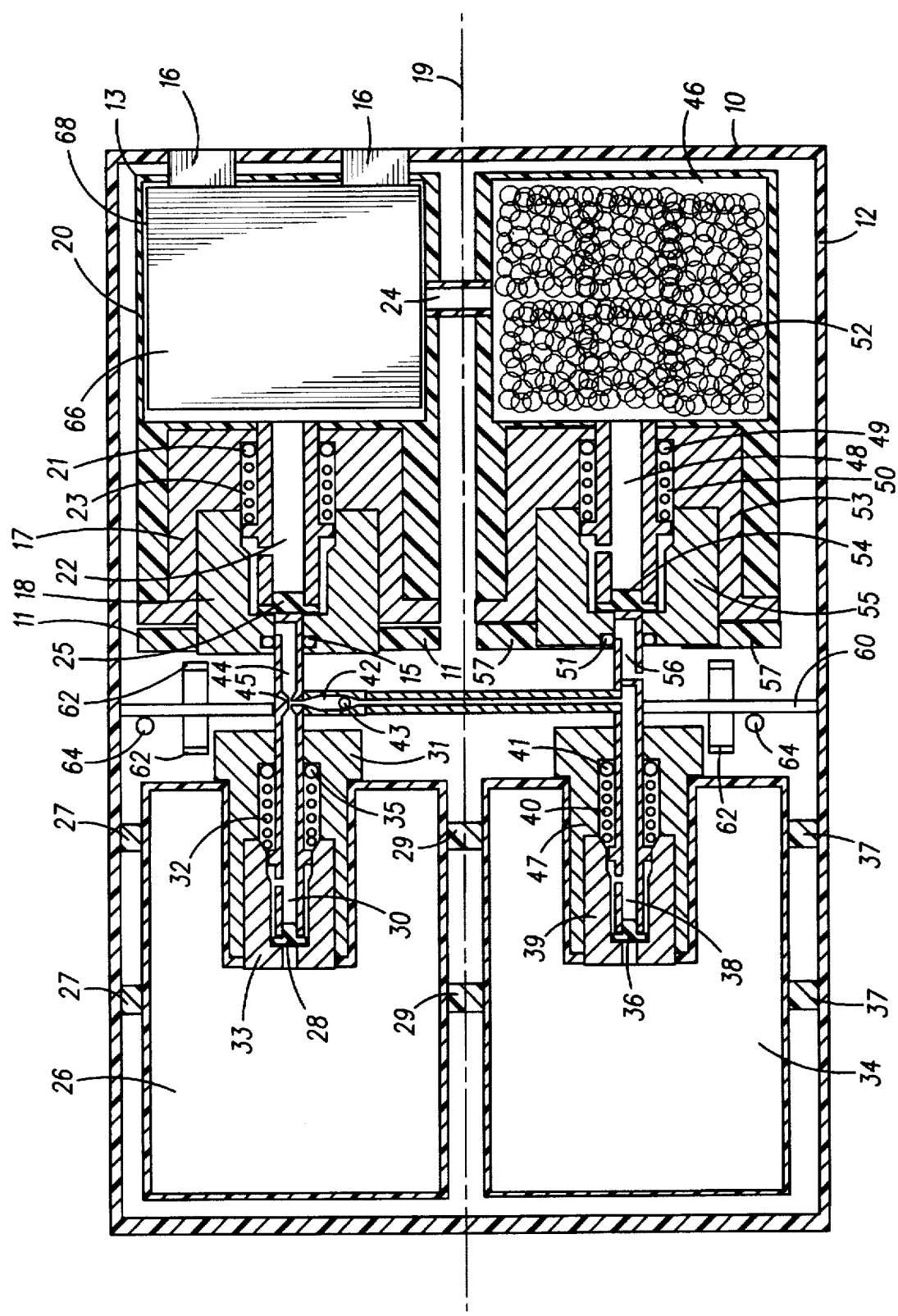
FIG. 2 is a cross-sectional view of the portable fuel cell device in FIG. 1 in a closed position taken along line 2—2.
Figure 3:
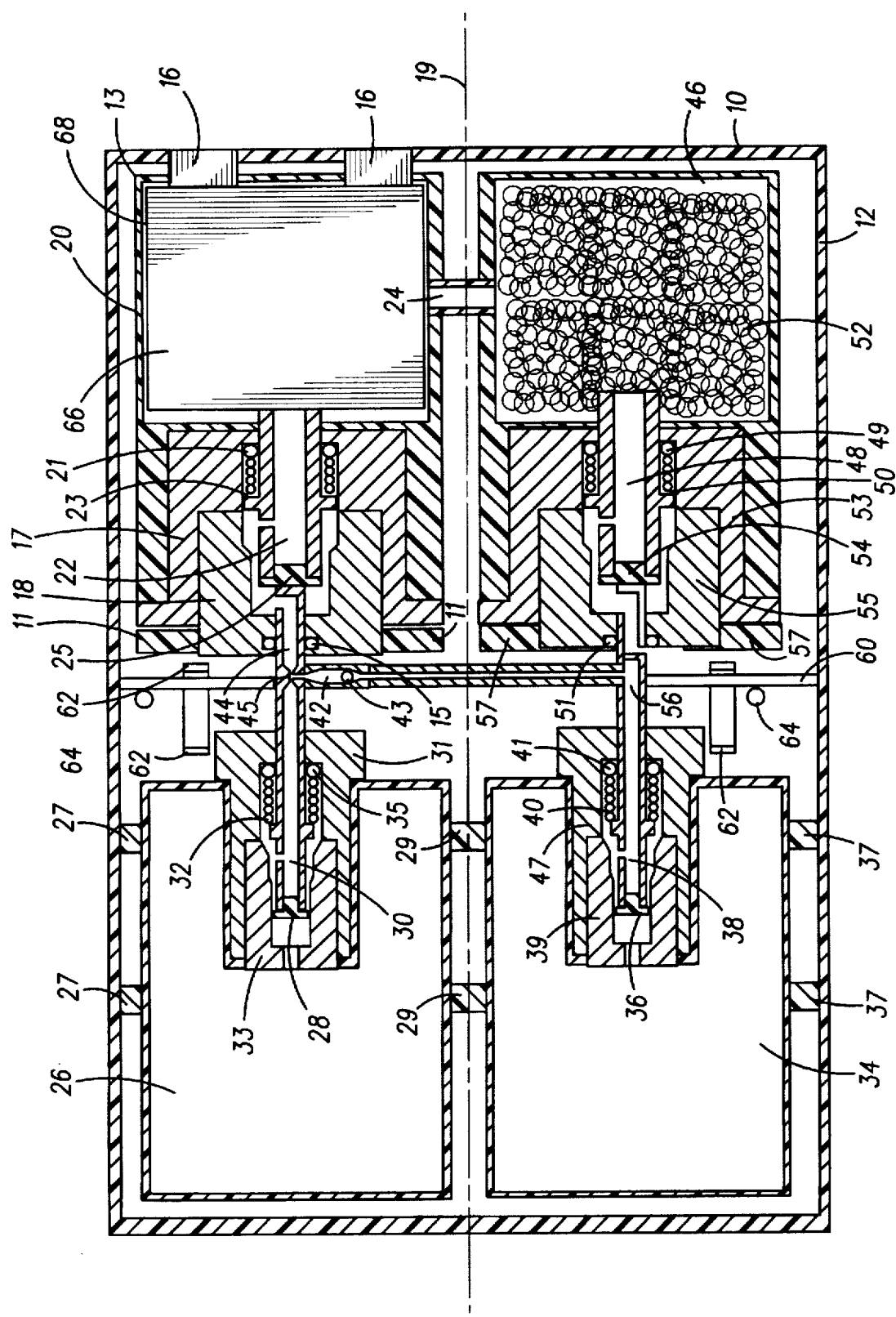
FIG. 3 is a cross-sectional view of the portable fuel cell device in FIG. 1 in an open position taken along line 2—2.

On-off lever 60 is shown in FIG. 2 in the closed position and in FIG. 3 in the open position. On-off lever 60 runs perpendicular to axis 19 and is supported by on-off lever supports 62 and raised dimples 64.

As an example of preferred operation, portable fuel cell device 10 begins in a closed position as indicated in FIG. 2. When in the closed position, fuel line 30, oxidant line 38, by-products exhaust line 48, and fuel mixture inlet 22 are all in a closed, sealed position. When on-off lever 60 is moved to the open position as shown in FIG. 3, fuel line 30, oxidant line 38, by-products exhaust line 48, and fuel mixture inlet 22 are all moved to an open position. Fuel flows from fuel reservoir 26 into fuel line 30 and oxidant flows from oxidant chamber 34 into oxidant line 38. The fuel and oxidant are mixed by aspirator 42 and introduced into reaction chamber 20 by way of fuel-oxidant line 44 and fuel mixture inlet 22. The fuel-oxidant mixture is allowed to react in reaction chamber 20, thereby producing electricity transferred through contacts 16. The exhaust gas produced by the reaction in reaction chamber 20 is passed through exhaust line 24 into water trap 46. The exhaust gas, typically comprised of water and carbon dioxide, passes through water-absorbing medium 52. In a preferred embodiment, water is trapped in water-absorbing medium 52, while the carbon dioxide is passed through by-products exhaust line 48 into exhaust vent 56 and into the ambient atmosphere. In an alternate embodiment, both the water and the carbon dioxide are absorbed by water-absorbing medium 52.

In an alternate embodiment, oxidant chamber 34 is replaced with a second fuel chamber. In this alternate embodiment, oxidant line 38 uses ambient air as the oxidant. The ambient air is combined with fuel from either of the fuel chambers and reacted in the fuel cell. In this embodiment, the fuel capacity is doubled due to the expansion of fuel chamber space.

The present invention provides a significant improvement over the prior art. The invention allows portable fuel cells to be used to power portable products while effectively processing the by-product exhausts produced by the fuel cell reaction.

While this invention has been described in terms of certain examples thereof, it is not intended that it be limited to the above description, but rather only to the extent set forth in the claims that follow.

The embodiments of this invention in which an exclusive property or privilege is claimed are defined as follows:

1. A portable fuel cell device for reacting a gaseous fuel and a gaseous oxidant to produce electricity, said reaction resulting in the formation of gaseous products including water vapor and carbon dioxide, said portable fuel cell device comprising:

a fuel cell comprising a reaction chamber and means within the reaction chamber for generating electricity by reacting a mixture comprising a gaseous fuel and a gaseous oxidant;

a fuel line connected to the reaction chamber for introducing the mixture into the fuel cell;

a fuel reservoir connected to the fuel line for supplying gaseous fuel to the reaction chamber;

means connected to the fuel line for mixing a gaseous oxidant with the gaseous fuel to form the mixture;

an exhaust line connected to the reaction chamber for expelling exhaust gas from the reaction chamber, said exhaust gas containing gaseous products;

a water trap connected to the exhaust line and containing a water absorbing medium for absorbing water vapor from the exhaust gas, thereby forming a dry exhaust gas; and a vent for releasing the dry exhaust gas from the water trap into the ambient atmosphere.

2. A portable fuel cell device in accordance with claim 1, wherein the gaseous oxidant is air.

3. A portable fuel cell device in accordance with claim 1, wherein the water absorbing medium is comprised of a copolymer of sodium polyacrylate and polyacrylamide.

4. A portable fuel cell device in accordance with claim 1, wherein the water absorbing medium is comprised of ascarite.

5. A portable fuel cell device in accordance with claim 1, wherein the fuel reservoir comprises a male compression fitting and the fuel line comprises a female compression fitting adapted to receive the male compression fitting to form a hermetic seal, whereby the fuel reservoir is readily connected to and disconnected from the fuel line.

6. A portable fuel cell device for reacting a gaseous organic fuel and oxygen to produce electricity, said reaction resulting in the formation of gaseous products including water vapor and carbon dioxide, said portable fuel cell device comprising:

a fuel cell comprising a reaction chamber and means within the reaction chamber for generating electricity by reacting a mixture comprising the gaseous organic fuel and oxygen;

a fuel line connected to the reaction chamber for delivering the mixture into the fuel cell;

a fuel reservoir containing the organic fuel at a pressure greater than ambient pressure and connected to the fuel line for supplying gaseous organic fuel thereto;

aspiration means connected to the fuel line for drawing oxygen gas into the fuel line and for mixing the gaseous organic fuel and the oxygen gas to form the mixture;

an exhaust line connected to the reaction chamber for expelling exhaust gas from the reaction chamber, said gas containing gaseous products;

a water trap connected to the exhaust line and containing a water absorbing medium for absorbing water vapor from the exhaust gas; and a vent for releasing gas from the water trap into the ambient atmosphere.

7. A portable fuel cell device in accordance with claim 6, wherein the oxygen gas is air.

8. A portable fuel cell device in accordance with claim 6, wherein the water absorbing medium is comprised of a copolymer of sodium polyacrylate and polyacrylamide.

9. A portable fuel cell device in accordance with claim 6, wherein the water absorbing medium is comprised of ascarite.

10. A portable fuel cell device in accordance with claim 6, wherein the fuel reservoir comprises a male compression fitting and the fuel line comprises a female compression fitting adapted to receive the male compression fitting to form a hermetic seal therewith, whereby the fuel reservoir is readily connected to and disconnected from the fuel line.

11. A portable fuel cell device for reacting a gaseous mixture comprising an organic fuel and air to produce electricity, said reaction resulting in the formation of gaseous products including water vapor and carbon dioxide, said portable fuel cell device comprising:

a fuel cell comprising a reaction chamber and means within the reaction chamber for generating electricity by reacting the gaseous mixture;

a fuel line connected to the reaction chamber for delivering the gaseous mixture into the fuel cell;

a fuel reservoir containing the organic fuel at a pressure greater than ambient pressure and connected to the fuel line for releasing gaseous organic fuel into the fuel line at a pressure greater than ambient pressure;

an aspirator connected to the fuel line for drawing air into the fuel line and for mixing the gaseous organic fuel and the air to form the mixture;

an exhaust line connected to the reaction chamber for expelling exhaust gas from the reaction chamber, said exhaust gas containing the gaseous products;

a water trap connected to the exhaust line and containing a water absorbing medium for absorbing water vapor from the exhaust gas to form a dry exhaust gas; and a vent for releasing the dry exhaust gas from the water trap into the ambient atmosphere.

* * * * *